July 14, 1970  TOMOJI MURATA ET AL  3,520,598
RELEASE DEVICE FOR MOVIE CAMERA
Filed Nov. 15, 1967  2 Sheets-Sheet 1
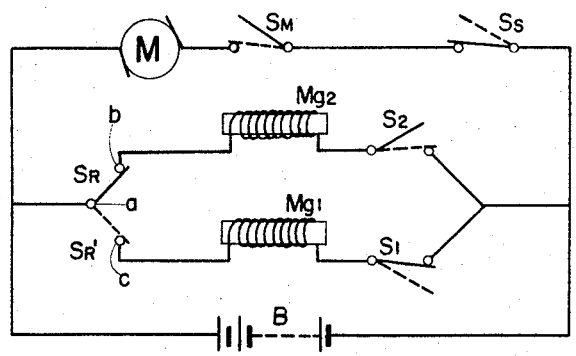
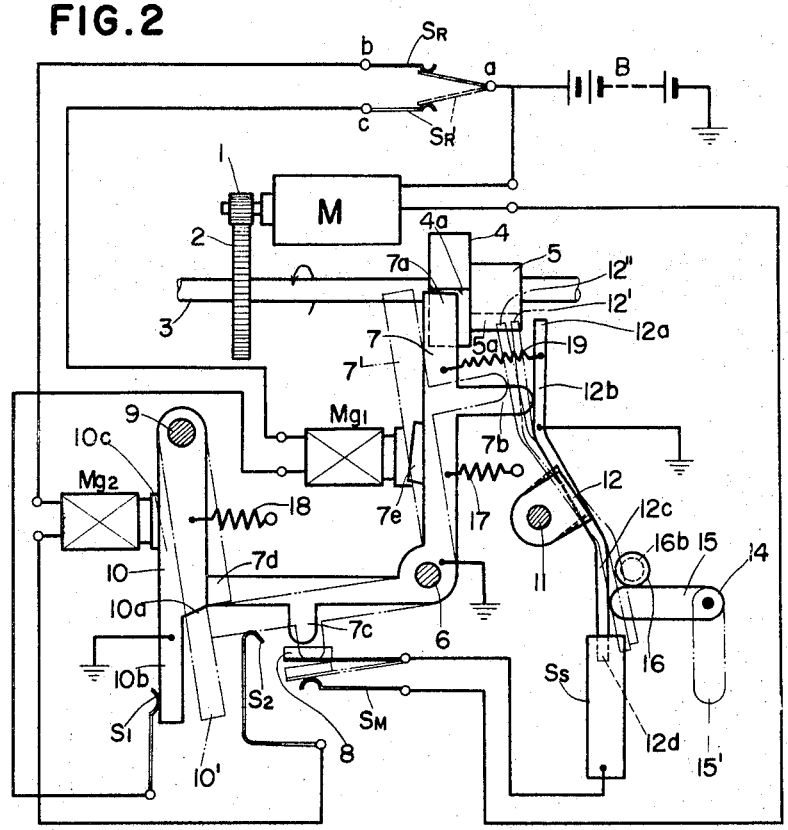

United States Patent Office 3,520,598
Patented July 14, 1970

3,520,598
RELEASE DEVICE FOR MOVIE CAMERA
Tomoji Murata, 2306 Kanaoka-cho, Sakai, Japan;
Keiichi Nomura, 18 Yamasaka-cho 3, Higashisumi-
yoshi-ku, and Takeshi Ataka, 9 Kohama Nishino-cho,
3-chome, Sumiyoshi-ku, both of Osaka, Japan; and
Isamu Kubota, C/o Minolta Camera Company's Second
House, 312, 761 Mozu Akahata 5-cho, Sakai, Japan
Filed Nov. 15, 1967, Ser. No. 683,324
Claims priority, application Japan, Nov. 15, 1966,
41/75,143, 41/105,347; Nov. 16, 1966, 41/75,363;
Mar. 14, 1967, 42/16,024
Int. Cl. G03b 17/46
U.S. Cl. 352—169
2 Claims

ABSTRACT OF THE DISCLOSURE

A release device for a motion picture camera has a first pivotal lever which is spring biased into the path of rotation of a projection member on the shutter shaft. A first solenoid, when energized pivots the first lever out of the path of rotation so that the shutter shaft is driven by the drive motor of the camera. A second pivotal lever is spring biased to engage the first lever and maintain the first lever in a position out of the path of rotation of the shutter shaft. A second solenoid may be energized to pivot the second lever such that the first lever is released and returned to its blocking position. A third lever is attached to the first lever and provides a stop after one revolution of the shutter shaft when taking still pictures.

---

This invention relates to a release device for a movie camera, and more particularly to a release device for a compact movie camera having one or more built-in electromagnets for controlling a shutter driving shaft. With the release device according to the present invention, said electromagnet is energized momentarily at the time of start and stop of the shutter driving shaft to control both the switching of a motor circuit and the position of a switch lever, in such a manner that the rotation of said shutter driving shaft is effected simply by closing and opening an electric switch. The shutter driving shaft stops at a predetermined position even during remotely controlled operation, and such stoppage of the shutter driving shaft at a definite position makes single frame shooting possible. The release device can be equipped with a self-timer and a time switch of simple construction, despite the fact that in relation to conventional release devices very complicated self-timers and time switches have been necessary even if it is possible to use them. The power required by the electromagnet of the release device of the invention is very small. Thus, an object of the present invention is to provide an efficient release device of simple structure for a movie camera.

Such a release device for a compact movie camera having a shutter driving shaft, a film driving shaft, and a stop lever to be actuated only mechanically has been known. Such known release device can be remotely controlled by moving the stop lever to a predetermined position and holding it there stationary so as to control said driving shafts only by closing and opening a motor circuit. With the conventional release device, however, the position at which the shutter driving shaft stops is not constant, and the probability of incomplete closing of shutter blades at the end of the rotation of the shutter driving shaft is as high as 50% and above, and accordingly, film loss increases to make the camera operation expensive. After being developed, the film must be edited by cutting off the thus mis-exposed portions thereof to properly compile the properly developed portions. Such elimination of the portions of the film which are developed undesirably, due to the incomplete closing of the shutter blades, will obviously require extra or additional labor and consequent expense. Furthermore, since the stop lever is held stationary during the remotely controlled operation, the single frame shooting is usually impossible with such known release device.

In order to obviate such difficulties, a method has been proposed to use a built-in electromagnet in the release device for the movie camera, so as to hold a stop lever by feeding an electric current through the electromagnet to allow rotation of the shutter driving shaft, while to release the stop lever by interrupting said current through the electromagnet to stop the shutter driving shaft. Such method, however, has the drawback that the electromagnet is kept energized so long as the shutter driving shaft is rotated, and hence, the small batteries of a compact movie camera are discharged quickly. Accordingly, the batteries have to be replaced frequently which increases the operating cost of the camera. Thereby, such method has not yet been practiced.

Therefore, an object of the present invention is to provide a release device for the movie camera having one or more specially arranged electromagnets to be free from the aforesaid difficulties of the known cameras. By using the release device according to the present invention, both the shutter driving shaft and the film driving shaft stop at a predetermined angular position regardless of whether they are operated directly by a release switch or remotely controlled by a suitable remote means. Thus, film wastage and laborious work of eliminating mis-disposed film portions, which have been inevitable with conventional release devices, can be completely obviated. The duration of energization of the electromagnet of the present invention is very short with very little energy consumption, and hence, it can be used advantageously with a compact movie camera having only small batteries.

With a known release device, a stop lever is held stationary during the remotely controlled operation, by releasing the engagement of the stop lever with a stopper of a shutter driving shaft. On the other hand, with the release device of the present invention, such releasing and holding of the stop lever are not necessary, and the remotely controlled operation can be actuated simply by moving a turn-over lever. Besides, by using the release device of the invention, the single frame shooting can be remotely controlled, and a timer can be easily incorporated so as to enable the automatic slow shooting.

Furthermore, in a known shutter release device, a lever or link means has been necessary to mechanically relate a stop lever to a shutter release button or a trigger, while with the release device of the present invention, the releasing operation can be actuated only by turning over a release switch. Thus, the operating members of the shutter release device of the invention can be located at any suitable part of the camera without providing any mechanical connection with the stopping mechanism of the shutter driving shaft. Accordingly, freedom in choice of the operating system can be increased. In addition, other modifications, such as application of the self-timer and use of wireless remote control system, can be easily made. Thus, the release device of the invention has a number of advantages, as compared with conventional release devices.

Another object of the present invention is to provide a single frame shooting device of simple construction, which can be easily operated substantially without making any adjustment. The shutter driving shaft of the single frame shooting device can be actuated only by turning a switch, and the single frame shooting can be made even during remotely controlled operation.

Other objects and a fuller understanding of the invention may be had by referring to the following description, taken in conjunction with the accompanying drawings, in which:

FIG. 1 is a schematic diagram of an electric circuit to be used in a release device according to the present invention;

FIG. 2 is a plan view of a release device embodying the present invention;

Like parts are designated by like symbols and numerals throughout the drawings.

Figure 3:
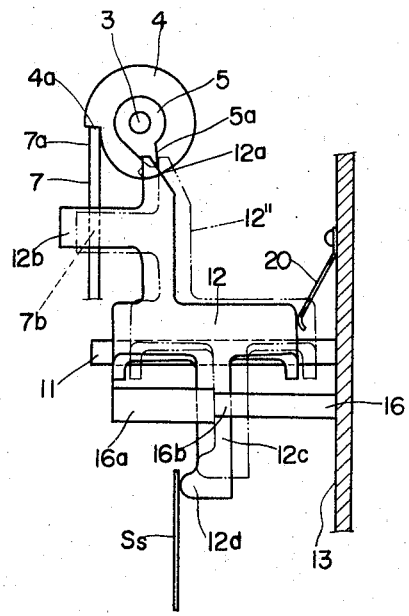
FIG. 3 is a fragmental side elevation of the release device.

Now, referring to FIGS. 1 to 4, showing a release device according to the present invention, the torque of a driving motor M is transmitted to a driving shaft 3 through the engagement of a pinion 1 of the motor M with a driving gear 2 mounted on the shaft 3. A rotation stopper 4 and a single frame shooting stopper 5 are secured to the driving shaft 3. A stop lever 7 is pivotally supported by a shaft 6 secured to a base plate 13 of the release device in such a manner that the tip end 7a of the stop lever 7 is engageable with a stop notch 4a of the rotation stopper 4, as shown in FIG. 3.

A single frame shooting stop lever 12 is pivotally supported by another shaft 11 secured to the base plate 13, so that the tip end 12a of the lever 12 is engageable with a stop notch 5a of the single frame shooting stopper 5, as best shown in FIG. 3. A contraction spring 19 is inserted between the stop lever 7 and the single frame shooting stop lever 12 in such a manner that a spacing lug 7b formed on the stop lever 7 is kept in contact with a contact lug 12b formed integrally with the single frame shooting stop lever 12.

The stop lever 7 has an actuating lug 7c located at the tail portion thereof for actuating a switch contact 8 to be selectively engaged with a motor switch contact $S_M$, a stopping lug 7d formed at the tail end thereof so as to be selectively engaged with both a stopping contact $S_2$ and a lock lever 10 pivotally supported by a shaft 9 secured to the base plate 13, and an armature 7e to be attracted by a starting electromagnet $M_{g1}$ but biased away from the electromagnet $M_{g1}$ by a bias spring 17. The stop lever 7 is electrically grounded.

The lock lever 10 has a notch 10a to lock the stopping lug 7d, a starting lug 10b formed integrally at the tail end thereof to be selectively engaged with a starting contact $S_1$, and an armature 10c to be attracted by a stopping electromagnet $M_{g2}$. The lock lever 10 is biased away from the stopping magnet $M_{g2}$ by a biasing spring 18, and it is electrically grounded.

The single frame shooting stop lever 12 further comprises an arm 12c and a tail end 12d constituting a single frame shooting actuator to be engaged with a single frame shooting motor switch contact $S_S$. The stop lever 12 is also electrically grounded.

In other words, motor switch contacts $S_M$ and $S_S$ are connected in series and then inserted between the motor M and batteries B, so that the motor M is stopped whenever either of the switch contacts $S_M$ or $S_S$ is opened, while the motor M can be actuated only when both the switch contacts $S_M$ and $S_S$ are closed. A release switch contact $S_R$ is inserted in the circuits of the starting electromagnet $M_{g1}$ and stopping electromagnet $M_{g2}$, in conjunction with the aforesaid starting and stopping switches $S_1$ and $S_2$.

The arm 12c of the single frame shooting stop lever 12 is engaged with both a turn-over lever 15 pivotally supported by a shaft 14 secured to the base plate 13 and a single frame shooting lock bar 16 secured to the base plate 13, which bar 16 has a thin portion 16b secured to the base plate and a thick portion 16a, as shown in FIG. 3. A bias spring 20 is inserted between the stop lever 12 and the base plate 13 to bias the stop lever 12 away from the base plate 13, so that the tail end 12d is kept in contact with the single frame shooting motor switch contact $S_S$.

With the release device of the aforesaid construction, according to the present invention, continuous shooting can be carried out as follows. At first, the turn-over lever 15 is turned to the position shown in solid lines in FIG. 2 to bring it into contact with the arm 12c of the single frame shooting stop lever 12 to lock it against the biasing force of the contraction spring 19, so that the tip end 12a is kept away from the notch 5a of the single frame shooting stopper 5. When the release switch contact $S_R$ is turned to the position $S_R'$, since the starting switch contact $S_1$ is engaged with the switching lug 10b, an electric current flows through the starting electromagnet $M_{g1}$ to energize it. The armature 7e is attracted to the electromagnet $M_{g1}$ against the elastic force of the springs 17 and 19 to rotate the stop lever 7 counterclockwise around the shaft 6, as seen in FIG. 2, to the position 7' as shown in dash-dot lines in the figure. As a result, the tip end 7a of the stop lever 7 is removed from the notch 4a of the rotation stopper 4 to allow the rotation of the driving shaft 3. At the same time, the movement of the stop lever 7 to the position 7' actuates the switch contact 8 to push it down by the actuating lug 7c for closing the switch contact $S_M$, while the single frame shooting motor switch contact $S_S$ is closed, and hence, the motor M is actuated to drive the shaft 3 through the pinion 2 and the driving gear 2. Then, the stopping lug 7d moves along the surface of the lock lever 10 until it engages with the notch 10a of the lever 10 to allow rotation of the lever 10 around the shaft 9 by the elastic force of the bias spring 18 toward the position 10', as shown in dash-dot lines in FIG. 2. Thus, the starting switch contact $S_1$ is opened by the counter-clockwise movement of the lock lever 10 to interrupt the current through the starting electromagnet $M_{g1}$. Accordingly, the attraction of the electromagnet $M_{g1}$ diminishes, and the stop lever 7 tends to turn clockwise by the elastic force of the bias springs 17 and 19, but the stopping lug 7d engaged with the notch 10a of the lock lever prevents such tendency and keeps the lock lever 7 in the position 7', as shown in the dash-dot lines. Therefore, the driving shaft continues its rotation to effect the continuous shooting.

With the stopping lug 7d thus engaged with the notch 10a of the lock lever, the stopping switch contact $S_2$ is closed by the actuating lug 7c, as shown in FIG. 2. However, since the release switch $S_R$ is held at the position $S_R'$, no current flows through the stopping electromagnet $M_{g2}$. In other words, in the aforesaid continuous shooting operation, the duration of the current flow through the starting electromagnet $M_{g1}$ is merely from the moment when the stop lever starts to rotate toward the illustrated position 7' until the stopping lug 7d engages with the notch 10a of the lock lever 10, and thus it is very short. The motor actuating circuit is kept energized once the stopping lug 7d is locked by the notch 10a of the lock lever 10.

In order to stop the continuous shooting operation, the release switch $S_R$ is turned from the illustrated position $S_R'$ to the position shown in solid lines. Then, as described in the foregoing, a current flows through the stopping electromagnet $M_{g2}$ to energize it. Accordingly, the armature 10c of the lock lever 10 is attracted toward the stopping electromagnet $M_{g2}$ against the elastic force of the bias spring 18 and moves from the position 10' to the position 10, as shown in solid lines in FIG. 2. Thus, the locking action on the stop lever 7 is released. At this moment, the starting switch contact $S_1$ is closed by the starting lug 10b, but since the release switch contact $S_R$ is located at the position shown in solid lines, the starting electromagnet $M_{g1}$ is not energized.

Upon release of the locking, the stop lever 7 moves from the position 7', as shown in dash-dot lines, to the other position 7, as shown in solid lines, by the elastic force of the bias and contraction springs 17 and 19. Then, the stopping lug 7d moves away from the stopping switch contact S₂ to interrupt the current through the stopping electromagnet $M_{g2}$, and the lug 7d moves from the notch 10a to the side of the lock lever 10, which is higher than the notch 10a, so as to prevent the lock lever 10 from being rotated by the bias spring 18. As the stop lever reaches the position 7, as shown in solid lines, the actuating lug 7c moves away from the switch contact 8 of the motor switch contact $S_M$ to open the contacts and interrupt the current through the motor M. Concurrently, the tip end 7a of the stop lever 7 engages with the notch 4a of the stopper 4 to stop the driving shaft 3. It should be noted here that the duration of the energization of the stopping electromagnet $M_{g2}$ is very short.

Thus, the release device comes back to the original position and is ready for the succeeding continuous shooting operation responsive to actuation of the release switch contact $S_R$, provided that the turn-over lever 15 is at the position as shown in solid lines in FIG. 2.

In order to effect single frame shooting, at first, the turn-over lever 15 is turned to a position 15', as shown in dash-dot lines in FIG. 2, so that the single frame shooting stop lever 12 is actuated by the contraction spring 19. Due to the fact that the contact lug 12b of the single frame shooting stop lever 12 is kept in contact with the corresponding spacing lever 7b of the stop lever 7 by means of the contraction spring 19, the former stop lever 12 is held at the position as shown in solid lines in FIGS. 2 and 3 even after setting the turn-over 15 to the position 15' as long as the release switch contact $S_R$ is kept at the position shown in solid lines in FIG. 3.

When the release switch $S_R$ is moved to the position $S_R'$, as shown by the dash-dot lines in FIG. 2, the stop lever 7 and the lock lever 10 move to the positions 7' and 10', respectively, as in the case of continuous shooting, and the motor M is actuated to start the rotation of the driving shaft 3. At the same time, the single frame shooting stop lever 12 follows the movement of the stop lever 7 due to the connection through the contraction spring 19 and lever 7 begins to rotate around the shaft 11 in a counter-clockwise direction toward the position 12', as shown in dash-dot lines in FIG. 2. At this moment, the single frame shooting stop lever 12 is pushed upwards, or leftwards in FIG. 3, by the bias spring 20, and the tip end 12a of the stop lever 12 is positioned above or at the back of the notch 5a of the single frame shooting stopper 5, and hence the tip end 12a of the stop lever 12 is not engaged with the front surface of the notch 5a of the stopper 5 to allow rotation of the driving shaft 3. The arm 12c at the tail portion of the single frame shooting stop lever 12 is brought into contact with the thick portion 16a of the single frame shooting lock bar 16 to prevent further counter-clockwise rotation of the stop lever 12 even when it is pulled by the contraction spring 19 as the stop lever 7 moves toward the position 7'. Thus, the spring 19 is extended to urge the stop lever 12 against the lock bar 16, and the tail end 12d is kept in contact with the single frame shooting switch contacts $S_S$ to keep the contact as closed.

Then, as the driving shaft 3 is going to complete its full rotation, the front surface of the notch 5a of the single frame shooting stopper 5 comes into engagement with the tip end 12a of the single frame shooting stop lever 12, and the stop lever 12 is moved downward, or rightward in FIG. 3, to the position 12", as shown in dash-dot lines in FIG. 3. Accordingly, the arm 12c of the stop lever 12 moves from the thick portion 16a to the thin portion 16b to separate the tail end 12d of the stop lever from the single frame shooting switch contact $S_S$. Thus, the current through the motor M is interrupted, and the driving shaft 3 stops after completion of a full rotation, or rotation by 360 degrees. The single frame shooting stop lever 12 is held at the position 12" by the elastic force of the contraction spring 19. Accordingly, the operation for the single frame shooting is finished.

Thereafter, when the release switch contact $S_R$ is moved from the position $S_R'$, as shown by the dash-dot lines, to the position $S_R$, as shown by the solid lines, the stop lever 7 and the lock lever 10 return to the respective solid line positions, and the spacing lug 7b of the stop lever 7 strikes the contact lug 12b of the single frame shooting stop lever 12 by the action of the bias spring 17. As a result, the stop lever 12 rotates clockwise in FIG. 2 to the position 12' by releasing the engagement between the arm 12c and the thin portion 16b of the lock bar 16, and further to the position 12, as shown in solid lines in the figures by releasing the engagement between the tip end 12a and the notch 5a of the stopper 5 and pushing the stop lever 12 upward, or leftward in FIG. 3, by the bias spring 20. Thus, each member of the release device returns to its original position.

Figure 4:
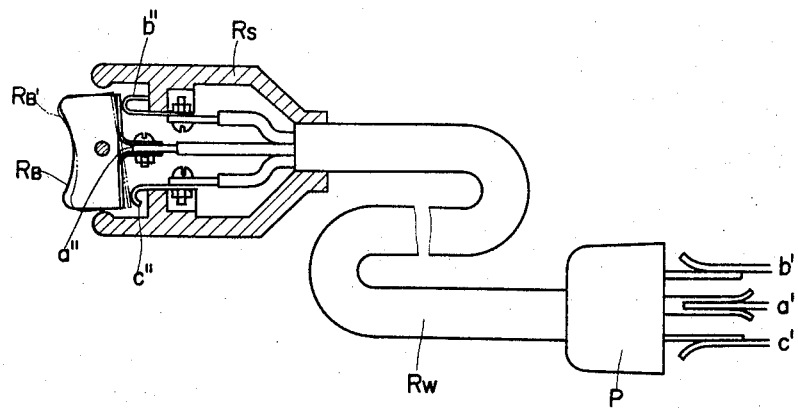
FIG. 4 is a diagrammatic illustration, in an enlarged scale, of a remote control switch usable in the device of FIG. 2.

In order to operate the aforesaid release device by so-called remote control means, three terminals a', b', and c' are provided on the release device, which are respectively connected to the terminal a of batteries B, the terminal b of the stopping electromagnet $M_{g2}$, and the terminal c of the starting electromagnet $M_{g1}$, as shown in FIG. 1. A remote control switch $R_S$ is connected to the terminals a', b', and c' thus provided through a three conductor cord $R_W$ having a three terminal plug P to engage with the aforesaid terminals, as shown in FIG. 4. The remote control switch $R_S$ has three contacts a", b", and c", respectively connected to the terminals a', b', and c' of the release device through the individual conductors of the cord $R_W$. The remote control switch $R_S$ also has a selector button $R_B$, which can assume two positions; namely, a position $R_B$, as shown in solid lines in FIG. 4 and corresponding to the position $S_R$ of FIG. 2, and another position $R_B'$, as shown in dash-dot lines in FIG. 4 and corresponding to the position $S_R'$ of FIG. 2. It is apparent to those skilled in the art that the release device can be controlled by actuating the remote control button $R_B$ in the same manner as actuating the release switch $S_R$.

What is claimed is:

1. A release device for a movie camera having a drive motor, a shutter driving shaft driven by said motor and an energizing circuit for said drive motor, said release device comprising: a rotation stopper secured to said shutter driving shaft, a stop lever engageable with said rotation stopper, a starting electromagnet positioned to attract said stop lever to start the shutter driving shaft by disengaging said stop lever from said stopper, an energizing circuit for said starting electromagnet, a lock lever to engage said stop lever for locking the stop lever at the thus attracted position, a stopping electromagnet positioned to attract said lock lever for stopping the rotation of said shutter driving shaft by releasing the locking of said stop lever, an energizing circuit for said stopping electromagnet, bias springs to urge said stop lever and said lock lever away from said starting and stopping electromagnets, respectively, a first switch operated by said lock lever so as to open and close said energizing circuit of said starting electromagnet, a second switch operated by said stop lever so as to open and close said energizing circuit of said stopping electromagnet, an actuator mounted on said lever to open and close an energizing circuit of said driving motor, and a release switch to selectively actuate said starting and stopping electromagnets.

2. A release device according to claim 1 further comprising a single frame shooting stopper secured to said shutter driving shaft, a pivotal single frame shooting stop lever adapted for engaging said single frame shooting stopper, a turn-over lever to hold said single frame shooting stop lever in a position in disengagement with said single frame shooting stopper, a single frame shooting lock bar to lock said single frame shooting lock lever upon completion of the single frame shooting operation, a spacing lug positioned to maintain a predetermined space between said stop lever and said single frame shooting stop lever so as to prevent engagement of said single frame shooting stop lever with said single frame shooting stopper as long as said stop lever is engaged with said rotation stopper, a spring acting on said single frame shooting stop lever to bias said single frame shooting stop lever toward said stop lever with said predetermined space therebetween, a single frame shooting switch inserted in the energizing circuit of said driving motor in series with said actuator, and another actuator mounted on said single frame shooting stop lever and positioned to open and close said single frame shooting switch to keep said single frame shooting switch closed when said single frame shooting stop lever is pivoted to a position in disengagement with said single frame shooting stopper.

References Cited
UNITED STATES PATENTS

| | | | |
|---|---|---|---|
| 2,083,646 | 6/1937 | Fuller | 352—176 |
| 3,238,008 | 3/1966 | Krumbein | 352—169 |
| 3,397,937 | 8/1968 | Schrader | 352—169 |

NORTON ANSHER, Primary Examiner

M. H. HAYES, Assistant Examiner

U.S. Cl. X.R.

352—137, 177, 178